United States Patent [19]
Lowenhaupt et al.

[11] Patent Number: 5,922,154
[45] Date of Patent: Jul. 13, 1999

[54] PNEUMATIC TIRE WITH SPECIFIED BREAKER COVER

[75] Inventors: Bernd Lowenhaupt, Bensheim; Hans-Joachim Winter, Gelnhausen, both of Germany

[73] Assignee: SP Reifenwerke GMBH, Hanau, Germany

[21] Appl. No.: 08/677,117

[22] Filed: Jul. 9, 1996

[30] Foreign Application Priority Data

Jul. 19, 1995 [DE] Germany .................... 195 26 408

[51] Int. Cl.⁶ .............. B60C 9/18; B60C 9/20; B60C 9/22
[52] U.S. Cl. ............ 152/531; 152/533; 156/117
[58] Field of Search .................. 152/531, 533; 156/117

[56] References Cited

U.S. PATENT DOCUMENTS

| 4,284,117 | 8/1981 | Poque et al. ............... 152/531 X |
| 4,869,307 | 9/1989 | Bormann et al. ............ 152/533 |
| 5,115,853 | 5/1992 | Oare et al. ................. 152/533 X |
| 5,445,203 | 8/1995 | Saito et al. ................ 152/531 X |
| 5,458,173 | 10/1995 | Yamashita ................. 152/531 X |

FOREIGN PATENT DOCUMENTS

| 0416893 | 3/1991 | European Pat. Off. ....... 152/531 |
| 0454432 | 10/1991 | European Pat. Off. .. |
| 0531136 | 3/1993 | European Pat. Off. .. |
| 0561177 | 9/1993 | European Pat. Off. ....... 152/533 |
| 4209817 | 9/1993 | Germany .................... 152/533 |
| 6-115312 | 4/1994 | Japan ........................ 152/533 |

OTHER PUBLICATIONS

*Mechanics of Pneumatic Tires*, ed. Samuel Clark: US Dept. of Transportation, pp. 63–64, Aug. 1981.

Primary Examiner—Adrienne C. Johnstone
Attorney, Agent, or Firm—Birch, Stewart, Kolasch & Birch, LLP

[57] ABSTRACT

A pneumatic vehicle tire includes a carcass, a tread strip, a breaker arrangement provided between the carcass and the tread strip and includes at least two breaker plies having threads or cords of non-metallic material which extend at a predetermined angle to the mid-circumferential plane of the tire and serve as reinforcing elements. A breaker cover surrounds the breaker arrangement, or at least in, regions of its width. The breaker cover includes at least one cover ply having threads or cords which extend at least substantially in the circumferential direction of the tire. The breaker cover has threads or cords of a heat-shrinking material substantially in the shoulder region of the tire. In the middle tire region lying between the threads or cords either no breaker cover is provided or a breaker cover is provided with threads or cords of a material with low thermal shrinkage or no thermal shrinkage.

19 Claims, 2 Drawing Sheets

1

PNEUMATIC TIRE WITH SPECIFIED BREAKER COVER

BACKGROUND OF THE INVENTION

1. Field of the Invention

The present invention relates to a pneumatic vehicle tire comprising a carcass, a tread strip, a breaker assembly provided between the carcass and the tread strip and comprising at least two breaker plies reinforced by threads or cords of non-metallic material which extend at a predetermined angle to the mid-circumferential plane of the tire and serve as a reinforcing element, and a breaker cover or bandage which surrounds the breaker arrangement, and which comprises at least one cover ply having reinforcing thread or cords which extend at least substantially in the circumferential direction of the tire.

2. Description of the Background Art

Such pneumatic vehicle tires are customarily manufactured using a cylindrical drum. The individual tire components, such as the carcass, breaker plies, breaker cover and bandage and tread strip, and laid one after the other onto the drum. The tire carcass thus assembled is then shaped into a heated tire mold, in which the tire tread pattern is formed and the tire is vulcanized.

In order to shape the tire carcass into the heated tire mold, the individual tire components must be sufficiently radially extensible so that they can adopt the final arched form in the heated tire mold. On the other hand, a finished tire with a change of shape due to an increase of diameter of the tire under static or dynamic loading should be avoided. Breaker plies of a tire permit extension to a predetermined degree, as a result of their cords which are inclined at a predetermined angle to the mid-circumferential plane of the tire. Through a suitable choice of and material, this extension can only be achieved for the breaker cover or bandage which has cords extending substantially in the circumferential direction of the tire. In this respect, the breaker cover serves to prevent separation of the breaker components during the operation of the tire. Despite the extensibility necessary for the manufacture of the tire, the breaker cover must therefore have an adequate strength. In customer tires with steel breakers, polyamide it used as a material for the cords of the breaker cover. Nylon has the advantage that it has an adequate extensibility for the manufacturing process of the tire, but nevertheless provides the breaker cover the adequate strength during the operation of the tire. This is attributed to the fact that nylon shrinks during heating-up of the tire during rolling. As the tire heats up more and more with increasing rotational speed, the retaining force of the breaker cover increases by a corresponding amount. In fact in the vulcanization process the nylon shrinks due to the high temperature and thus generates a strong hoop tension in the compression in the steel breaker plies. Thus the nylon provides both a pre-tension effect and a secondary strengthening of the breaker assembly when rolling in service.

However, in tires with a non-metallic breaker arrangement, the problem now exists that the breaker plies only oppose the shrinkage force of a nylon bandage with a low resistance. The tire heated in the tire heating mold thus deforms as a result of the shrinkage force of a nylon breaker cover as soon as the pressure used for forming of the tire tread pattern is removed.

It has thus been proposed that a non-shrinking material should be used for the threads or cords of the breaker cover, which nevertheless ensures adequate retaining force even with rapidly running tires. A material of this kind is, for example, aramid, which is comparatively expensive. Moreover, when using aramid special measures must be taken in order to ensure adequate extensibility of the breaker cover during tire manufacture.

SUMMARY OF THE INVENTION

The invention is thus based on the object of setting forth a pneumatic vehicle tire of the kind with non-metallic breaker plies, which does not have these disadvantages. In particular, the material used for threads or cords of the breaker cover should be favorably priced and satisfy the requirements which have been set.

According to the present invention this object is satisfied in a tire of the kind where the breaker cover has threads or cords of a heat-shrinkable material substantially in the shoulder region of the tire and in the central region of the tire lying therebetween. The present invention has either no breaker cover or a breaker cover is provided with threads or cords of a material with low or no thermal shrinkage.

Surprisingly it has turned out with this construction that the thermal shrinkage of the nylon in tire manufacture leads to no problems, or to easily controllable problems, when the use of nylon for the cords or the breaker cover is essentially restricted to the shoulder region of the tire. With this construction no penalties are tolerated with respect of the high speed running characteristics of the tire. In the operation of the tire, during fast running, the shrinkage forces which are produced by heating of the tire counteract the centrifugal forces on the breaker arrangement, which arise with increasing tire speed. In the operation of the tire, the resistance to compression of a steel belt is thus substantially replaced by the centrifugal forces acting on the breaker arrangement. However, in vulcanization deformations of the tire as a result of the heating are very small since thermal shrinkage only occurs in the shoulder region.

In the middle tire region the required extension of the breaker cover during tire manufacture is relatively small so that aramid can be straightforwardly used for the threads or cords of the breaker cover. In the same way threads or cords of glass fiber or carbon fiber can also be used. On the other hand, in the middle tire region a less strong but also less expensive material can be used, which is free of thermal shrinkage, such as rayon, or indeed a breaker cover can be dispensed with entirely since here the radial forces to be compensated are relatively small. In any event, no shrinkage force or only a low shrinkage force acts on the middle tire region on heating of the tire.

The parts of the breaker cover in the two shoulder regions of the tire with threads or cords of heat-shrinking material are preferably designed to be as narrow as possible in order to keep the effect of the thermal shrinkage during the manufacture of the tire as small as possible. However, a covering over the axial side edges of all breaker plies must be ensured. In any event, these parts should in each case not exceed 30% of the breaker width. With a customary vehicle tire the width of this region will thus amount to between about 5 mm and about 50 mm at each side of the tire, for example from about 5 mm to less than 15 mm.

In-accordance with a preferred embodiment, the parts of the breaker cover with threads or cords of heat-shrinking material in the two shoulder regions of the tire extend axially slightly further outwardly than the side edge of the broadest breaker ply and end axially slightly further inwardly than the side edge of the narrowest breaker ply. A special design could be effected such that only a few turns of the nylon threads or nylon cords are wound beyond the respective breaker edge.

The expansion of the breaker arrangement in the radial direction of the tire can be set to the desired amount by the choice of the degree of heat shrinkage of the material used for the threads or cords of the breaker cover and/or by the choice of the thickness and also of the winding strength of the breaker cover. The firmer the winding and the greater the thickness of the breaker cover, the higher the restraining force is needed with rapidly running tires. In particular the selection of winding and breaker cover materials can also be made such that the oppositely directed forces substantially cancel, i.e., no movement of the breaker arrangement takes place during operation of the tire. The restraining force can basically be set in this manner in the middle tire region.

Nylon in particular or also polyester can be considered as the material for the threads or cords of the breaker cover in the shoulder region. With both materials, a high retaining force with rapidly running tires can be achieved as well as a good extensibility during tire manufacture.

The breaker cover can thus be formed in the two shoulder regions of the tire and also in the central tire region lying therebetween, either as a broad band, whose ends are disposed so that they abut or overlap one another, or also from a narrow strip of a helically wound strip bandage, a so-called jointless bandage (JLB). The individual turns of the strip bandage can respectively overlap one another, with the width of overlap also changing in the axial direction of the tire. In this way the thickness and thus the shrinkage force of the breaker arrangement can be set among other things, which, in turn, determines the mobility of the breaker arrangement.

Aramid or rayon in particular can be also used for the threads or cords of the breaker cover in the middle tire region as material which does not shrink when heated or hardly shrinks when heated. The threads or cords of the breaker arrangement can consist of textile material, in particular, aramid. However, threads or cords of carbon fiber or also glass fiber can be provided. The breaker arrangement is preferably formed as a cut breaker.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
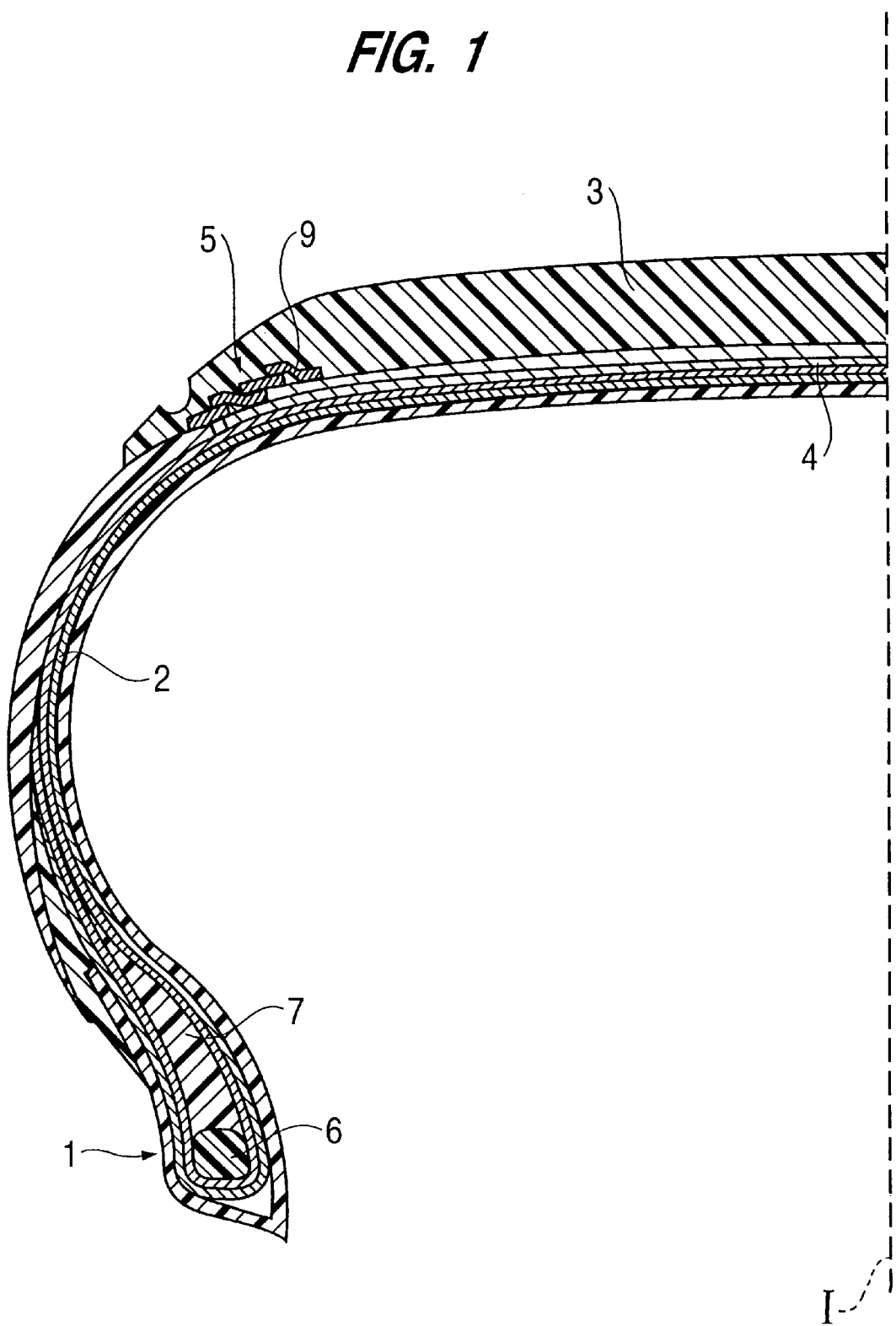
FIG. 1 is a cross section through one half of a pneumatic tire in accordance with the invention.

The tire shown in FIG. 1 has a carcass 2 extending between beads 1, anchored to bead rings 6, a tread strip 3 and a breaker assembly 4, provided between the carcass 2 and the tread strip 3 and consisting of two cut breaker plies 13,14 and also a breaker cover 5 surrounding the breaker arrangement. A bead apex 7 is arranged on the bead core 6. The two cut breaker plies 13 and 14 have different widths, as is generally customary in such tires, with the radially inner cut breaker ply 13 being wider than the radially outer cut breaker ply 14.

Figure 2:
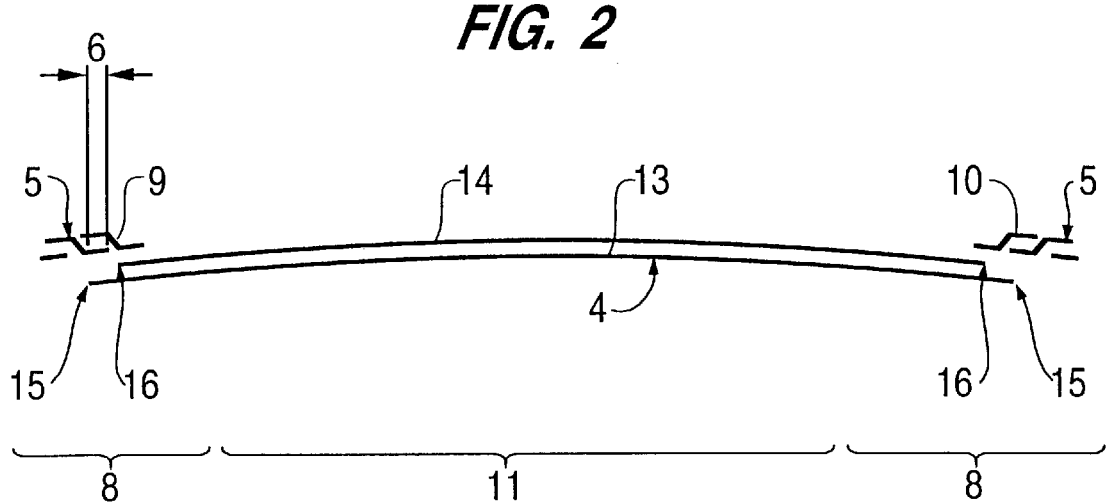
FIG. 2 is a schematic illustration of a first variant of a breaker arrangement and cover ply arrangement in accordance with the invention to a reduced scale in comparison to FIG. 1.

In FIG. 2 the breaker cover 5 is formed in two shoulder regions 8 by a strip bandage 9 and 10 respectively, each being formed from a narrow helically wound strip. The central tire region 11 disposed between them has no breaker cover. The two strip bandages 9 and 10 have threads or cords of heat-shrinking material, particularly nylon, and respectively extend over a region which starts axially outwardly of the side edge 15 of the wider breaker ply 13 and terminates axially somewhat further inwardly of the side edge 16 of the narrower breaker ply 14.

Figure 3:
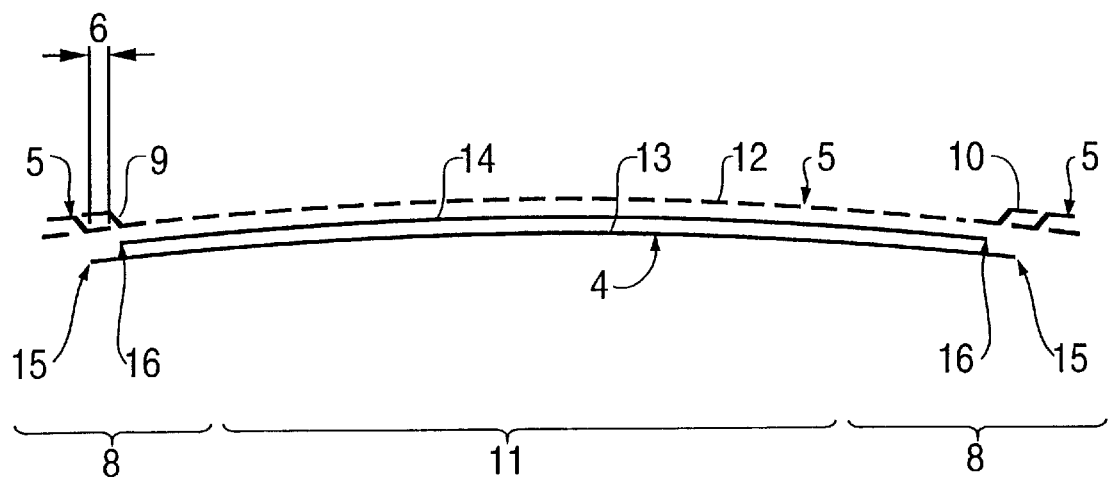
FIG. 3 is a second variant of a breaker arrangement and cover ply arrangement in accordance with the invention in an illustration corresponding to FIG. 2.

In the variant illustrated in FIG. 3 a breaker cover 5 is also present in the central tire region 11 in addition to the two-strip bandages 9 and 10 in the two shoulder regions 8 of the tire and is likewise formed as a strip bandage 12. In this variant the strip bandages 9 and 10 have threads or cords of heat-shrinking material, whereas the strip bandage 12 has threads or cords of a material which does not shrink when heated or hardly shrinks when heated, for example aramid or rayon.

In both variants the strip bandages 9 and 10 can also be wound, other than as shown, so that they do not overlap or overlap more, or the width of overlap b can be varied in the axial direction of the tire. Also a broad band assembly can in each case be provided in the two shoulder regions 8 of the tire instead of the strip bandages 9 and 10, with the ends of the broad band abutting or overlapping one another.

The same also applies to the-strip bandage 12, which can likewise be wound abutting or with mutually overlapping turns or can also be replaced by a broad band. The width of overlap b of the turns can also be selected to be different here in the axial direction of the tire.

In the illustrated embodiments the parts of the breaker cover 5 with threads or cords of heat-shrinking material are thus only used in the region of the side edges 15 and 16 of the breaker arrangement 4. The width of these parts can, however, amount in each case to about 30% of the width of the breaker arrangement 4, other than as illustrated. It is decisive that the shrinkage forces which occur during heating up of the tire are compensated to the extent that no unacceptable deformations of the tire are present. In operation of the tire the centrifugal forces of the breaker arrangement 4 in particular acts as a counterforce. During tire manufacture, the pressure used to mold the tire tread pattern acts as a counterforce. After the hot tire has been removed from the heated mold, some limited damage of deformation of the tire exits. This can, however, be largely avoided by suitable measures, for example by additional reinforcing inserts.

The tire of the invention is no only favorably priced in manufacture but is also characterized by very favorable tire characteristics, in particular by fast running characteristics. The movement of the breaker edges 15,16 of the breaker arrangement 4, which occurs during fast running of the tire, can be controlled via a suitable choice of heat-shrinking materials for the threads or cords of the breaker cover 5 in the two shoulder regions 8 prevent breaker separations or other defects of the tire from occurring. The centrifugal force acting on the breaker edges 15,16 thereby is counteracted by heat-shrinkage force of the breaker cover 5 in these two regions 8. A compression strength of the breaker arrangement 4 is thus not required so that the breaker arrangement 4 can be formed with threads or cords of non-metallic material and thereby the tire weight can be significantly reduced when compared with tires with metal cords.

The region 8 of the breaker cover 5 with threads or cords of heat-shrinking material can be kept very narrow so that a shrinkage force only acts in a narrowly restricted region on the breaker arrangement 4. In particular this region of the breaker cover 5 can be wound by only a few thread or cord turns beyond the respective breaker edges 15,16. For this purpose a winding of individual threads can also be provided instead of a strip bandage 9,10.

On the whole one thus obtains a tire which can be manufactured at reduced cost and is light and which is characterized by good tire characteristics, during rapid running.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

We claim:

1. A pneumatic vehicle tire comprising:
   a carcass;
   a tread strip;
   a breaker arrangement including first radially inner and second radially outer breaker plies reinforced by threads or cords, said threads or cords being made of a non-metallic material and extending at a predetermined angle relative to a mid-circumferential plane of the tire; and
   shoulder breaker cover plies having threads and cords which extend at least substantially in the circumferential direction of the tire, each shoulder breaker cover ply having a width of from about 5 mm to less than 15 mm, said threads or cords of said shoulder breaker cover plies being made of a heat-shrinkable material, a central region of said tire lying between each shoulder breaker cover ply being provided with no breaker cover ply or at least one central breaker cover ply having threads or cords being made of a substantially non-heat-shrinkable material.

2. The pneumatic vehicle tire in accordance with claim 1, wherein the heat-shrinkable material of the threads or cords of the shoulder breaker cover plies is nylon.

3. The pneumatic vehicle tire in accordance with claim 1, wherein the heat-shrinkable material of the threads or cords of the shoulder breaker cover plies is polyester.

4. The pneumatic vehicle tire in accordance with claim 1, wherein the shoulder breaker cover plies are formed in each case as a broad band with the ends of the band abutting or overlapping one another.

5. The pneumatic vehicle tire in accordance with claim 1, wherein at least one central breaker cover ply is present in the form of a broad band with the ends of the band abutting or overlapping one another.

6. The pneumatic vehicle tire in accordance with claim 1, wherein at least one central breaker cover ply is present in the form of a strip bandage wound helically from a narrow strip.

7. The pneumatic vehicle tire in accordance with claim 1, wherein the at least one breaker cover ply is present and aramid is the substantially non-heat-shrinkable material of the threads or cords of the at least one central breaker cover ply.

8. The pneumatic vehicle tire in accordance with claim 1, wherein the at least one central breaker cover ply is present and rayon is the substantially non-heat-shrinkable material of the at least one central breaker cover ply.

9. The pneumatic vehicle tire in accordance with claim 1, wherein the at least one central breaker cover ply is present and glass fiber is the substantially non-heat-shrinkable material of the threads or cords of the at least one central breaker cover ply.

10. The pneumatic vehicle tire in accordance with claim 1, wherein the at least one central breaker cover ply is present and carbon fiber is the substantially non-heat-shrinkable material of the threads or cords of the at least one central breaker cover ply.

11. The pneumatic vehicle tire in accordance with claim 1, wherein the breaker arrangement is formed as a cut breaker with the first and second plies being cut breaker plies.

12. The pneumatic vehicle tire in accordance with claim 1, wherein the breaker ply threads or cords are of aramid textile material.

13. The pneumatic vehicle tire in accordance with claim 1, wherein the breaker ply threads or cords are of carbon fiber.

14. The pneumatic vehicle tire in accordance with claim 1, wherein the breaker ply threads or cords are of glass fiber.

15. The pneumatic vehicle tire in accordance with claim 1, wherein the first radially inner breaker ply has a width greater than the width of the second radially outer breaker ply.

16. The pneumatic vehicle tire in accordance with claim 1, wherein the shoulder breaker cover plies cover at least axial side edges of the breaker plies.

17. The pneumatic vehicle tire in accordance with claim 1, wherein the shoulder breaker cover plies are formed in each case as a strip bandage helically wound from a narrow strip.

18. The pneumatic vehicle tire in accordance with claim 17, wherein neighboring turns of the strip bandage overlap one another at least in part.

19. The pneumatic vehicle tire in accordance with claim 18, wherein the overlap width varies in the axial direction of the tire.

* * * * *